(12) United States Patent
Knutson et al.

(10) Patent No.: US 9,353,466 B2
(45) Date of Patent: May 31, 2016

(54) HYBRID POWER TRANSMISSION CORD

(71) Applicant: Carlisle Transportation Products, Inc., Syracuse, NY (US)

(72) Inventors: Paul Steven Knutson, Republic, MO (US); Curtis Scott Hatch, Ozark, MO (US); Michael Darin Crites, Nixa, MO (US)

(73) Assignee: Timken SMO LLC, North Canton, OH (US)

( * ) Notice: Subject to any disclaimer, the term of this patent is extended or adjusted under 35 U.S.C. 154(b) by 699 days.

(21) Appl. No.: 13/690,289

(22) Filed: Nov. 30, 2012

(65) Prior Publication Data

US 2014/0073468 A1 Mar. 13, 2014

Related U.S. Application Data

(60) Provisional application No. 61/699,997, filed on Sep. 12, 2012.

(51) Int. Cl.
| | | |
|---|---|---|
| *D02G 3/44* | (2006.01) | |
| *D02G 3/28* | (2006.01) | |
| *F16G 1/10* | (2006.01) | |
| *F16G 5/08* | (2006.01) | |

(52) U.S. Cl.
CPC ............ *D02G 3/447* (2013.01); *D02G 3/28* (2013.01); *F16G 1/10* (2013.01); *F16G 5/08* (2013.01)

(58) Field of Classification Search
CPC ......... D02G 3/045; D02G 3/047; D02G 3/28; D02G 3/447; D07B 1/025; D07B 1/04; D07B 2201/102; D07B 2201/2205; D07B 2201/2066; F16G 5/08; F16G 1/10
See application file for complete search history.

(56) References Cited

U.S. PATENT DOCUMENTS

| | | |
|---|---|---|
| 2,755,214 A | 7/1956 | Lyons et al. |
| 3,419,059 A | 12/1968 | Bridge, Jr. |
| 3,455,100 A | 7/1969 | Sidles et al. |
| 4,083,260 A | 4/1978 | Carlson et al. |
| 4,155,394 A | 5/1979 | Shepherd et al. |
| 4,343,343 A | 8/1982 | Reuter |
| 4,790,802 A | 12/1988 | Onoe et al. |
| 4,893,665 A | 1/1990 | Reuter et al. |
| 4,987,030 A | 1/1991 | Saito et al. |
| 5,419,383 A | 5/1995 | Iwamura |
| 5,521,007 A | 5/1996 | Kurokawa |

(Continued)

FOREIGN PATENT DOCUMENTS

| | | |
|---|---|---|
| EP | 2 017 093 | 1/2009 |
| EP | 2 025 971 | 2/2009 |

(Continued)

OTHER PUBLICATIONS

Dupont; Advanced Performance Solutions for the Tire Industry; Nathan Love, Brian France, F.L. Gopez, Oct. 7, 2010.

(Continued)

*Primary Examiner* — Shuan R Hurley
(74) *Attorney, Agent, or Firm* — Calfee Halter & Griswold, LLP

(57) ABSTRACT

A heat-treated cord comprising a low modulus yarn core that is wrapped by a plurality of high modulus wrapping yarns that were heat-treated for a time at a temperature and under a load sufficient to provide a free shrinkage of at least 2½ percent and a shrinkage force of at least 3 pounds.

20 Claims, 9 Drawing Sheets

(56) References Cited

U.S. PATENT DOCUMENTS

| | | | |
|---|---|---|---|
| 5,558,144 | A | 9/1996 | Nakayasu et al. |
| 6,601,378 | B1 | 8/2003 | Fritsch et al. |
| 6,811,877 | B2 | 11/2004 | Haislet et al. |
| 6,855,423 | B2 | 2/2005 | Fidan et al. |
| 7,051,507 | B2 | 5/2006 | Fritsch et al. |
| 7,222,481 | B2 | 5/2007 | Esnault et al. |
| 7,572,745 | B2 | 8/2009 | Branch et al. |
| 2003/0060540 | A1* | 3/2003 | Rowan .................. D02G 3/28 523/222 |
| 2010/0065178 | A1* | 3/2010 | Imhoff ................... B60C 9/04 152/451 |
| 2011/0259501 | A1* | 10/2011 | Assaad ................ B60C 9/0042 152/527 |

FOREIGN PATENT DOCUMENTS

| | | |
|---|---|---|
| EP | 2 221 413 | 8/2010 |
| WO | 80/00069 | 1/1980 |

OTHER PUBLICATIONS

Teijin; Hybrid Cords; Michel van den Tweel, May 28, 2008.
International Search Report dated Aug. 2, 2013, for corresponding International Patent Application No. PCT/US2013/022024.
Written Opinion dated Aug. 2, 2013, for corresponding International Patent Application No. PCT/US2013/022024.

\* cited by examiner

HYBRID POWER TRANSMISSION CORD

FIELD OF THE INVENTION

The present invention relates generally to a hybrid power transmission cord for use in elastomeric articles such as endless power transmission belts.

BACKGROUND

Endless power transmission belts, popularly referred to as V-belts, are widely used throughout industry and such belts often have a load-carrying cord formed from a plurality of twisted yarns.

Applicant has recognized a long-felt but unmet need in the industry for a power transmission belt having both high flex fatigue life and low belt growth over the life of the belt, especially in misaligned uses.

An exemplary prior art cord 10 from U.S. Pat. No. 4,343,343 is shown in FIG. 1. FIG. 1 shows a composite cord 10 which is utilized to reinforce elastomeric articles, such as tires. This composite cord 10 comprises a core 12 around which is spirally or helically wrapped one or more high tenacity substantially inextensible yarns 14. In FIG. 1, two such yarns 14 are shown wrapped about the core 12. U.S. Pat. No. 4,343,343 comprises an unoriented polymeric core with elongation at break of at least 200%, which is very different from the present invention.

SUMMARY

A cord comprising a low modulus yarn core that is wrapped by a plurality of high modulus yarns. This design is believed to provide good tensile strength and flex fatigue life even in misaligned outdoor power equipment uses.

An exemplary heat-treated hybrid cord comprises:
a. at least one core yarn having a Young's modulus; and
b. a plurality of wrapping yarns twisted around the at least one core yarn, each wrapping yarn having a strength of at least 2.5 GPa and a Young's modulus that is at least 5 GPa greater than the Young's modulus of the at least one core yarn; and
c. wherein the wrapping yarns are twisted in a first direction and then twisted in the opposite direction in the range from about 1 to about 7 twists per inch around the at least core yarn to form a greige cord; and
d. wherein the wrapping yarns in the greige cord have an untwisted yarn length that is about 0.8% to about 5% greater than the untwisted yarn length of the at last one core yarn in the greige cord; and
e. wherein after twisting the residual twist for the at least one core yarn is in the range from about 1 to about 7 twists per inch in the greige cord and after twisting the residual twist for the wrapping yarns is in the range from about 2 to about 8 twists per inch in the greige cord; and
f. wherein the heat-treated hybrid cord has a LASE3 value of at least 190 pounds and an elongation at break of less than 10%.

An exemplary endless power transmission belt comprises an elastomeric body and at least one heat-treated hybrid cord disclosed herein embedded in the elastomeric body.

An exemplary method of making a heat-treated hybrid cord comprises:
providing at least one core yarn having a Young's modulus; and
providing a plurality of wrapping yarns, each wrapping yarn having a strength of at least 2.5 GPa and a Young's modulus that is at least 5 GPa greater than the Young's modulus of the at least one core yarn; and
pre-twisting the wrapping yarns in a first direction with a twist multiplier in the range of about 2 to about 6½; and
twisting the pre-twisted wrapping yarns and the core yarn in the opposite direction with a twist multiplier in the range of about 2 to about 6½ to form a greige hybrid cord; and
then heat-treating the greige cord; and
wherein the wrapping yarns in the greige cord have an untwisted yarn length that is about 0.8% to about 5% greater than the untwisted yarn length of the at last one core yarn in the hybrid cord.

DETAILED DESCRIPTION

The present application discloses a cord comprising a low modulus yarn core that is wrapped by a plurality of high modulus yarns ("hybrid cord"). An exemplary cord consists of a low modulus polyester yarn core that is wrapped by a plurality of high modulus aramid yarns. An exemplary embodiment of this cord consists of a low modulus polyester yarn core that is wrapped by a maximum number of high modulus aramid yarns. These cords are believed to provide good tensile strength and flex fatigue life even in misaligned uses, such as misaligned outdoor power equipment uses.

As used herein, "denier" or "den" is a unit of measure for the linear mass density of fibers and is the mass in grams per 9,000 meters.

As used herein, a "low modulus" yarn means a yarn having a Young's modulus of 5.0 to 70 gigapascals (GPa or kN/mm$^2$).

As used herein, a "high modulus" yarn means a yarn having a Young's modulus greater than 70 GPa and a strength greater than 2.5 GPa.

As used herein, "residual twist" means the twist remaining from the first twisting operation (or remaining from any intermediate twisting operations) after the final twisting operation in the opposite direction and is an indicator of the force within a twisted yarn construction that makes it tend to wind or unwind itself after the twisting operation is complete.

As used herein, "twists per inch" or "turns per inch" or simply "tpi" is a measure of how much twist a yarn has and means literally the number of twists in an inch of the yarn. It can be calculated in plied yarns counting the number of humps in one inch of the yarn and dividing by the number of strands plied together to make the yarn.

As used herein, "twist multiplier" or "TM" means the ratio of turns per inch to the square root of the yarn count. The yarn count can be estimated by 5315/denier. Thus, in general, the twist multiplier can be estimated by using the following:

$$TM = 0.01372 \times (denier)^{1/2} \times tpi$$

(from *Wellington Sears Handbook of Industrial Textiles*, Sabit Adanur, Technomic Publishing Co., 1995, page 616).

Figure 1:
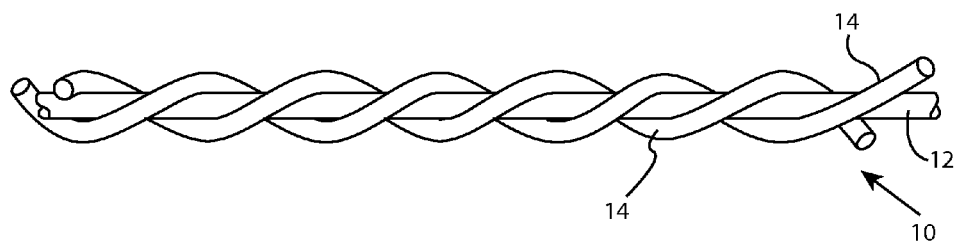
FIG. 1 shows a prior art cord.
Figure 2A:
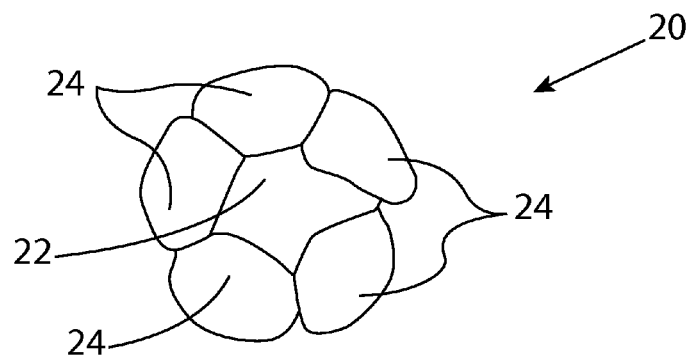
FIG. 2A is a photograph of a cross section of an exemplary cord according to the principles of the present application.
Figure 2B:
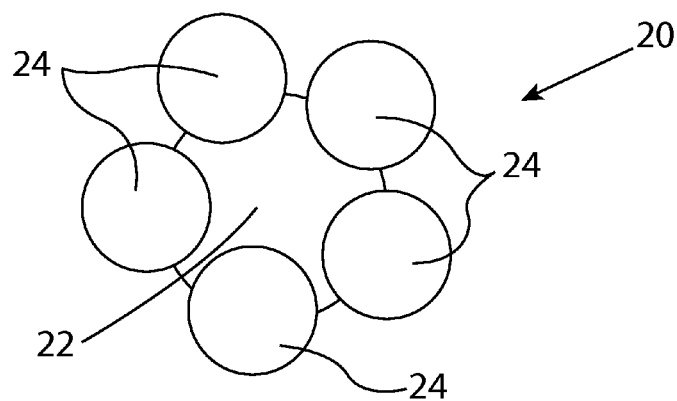
FIG. 2B is a schematic cross-sectional view of an exemplary cord according to the principles of the present application.

Referring now to the figures, FIGS. 2A and 2B show cross sections of an exemplary cord 20 according to the principles of the present application. Exemplary cord 20 comprises a low modulus yarn core 22 that is wrapped by a plurality of high modulus wrapping yarns 24. Thus, the low modulus core is relatively flexible as compared to the high modulus wrapping yarns. Each of the yarns 22, 24 may be composed of a plurality of filaments which are cabled together or twisted around each other.

The core 22 may consist of a yarn having a Young's modulus of 5.0 to 70 gigapascals GPa. Polyesters and/or polyamides are suitable materials for the core 22. Other suitable materials for the core 22 include PAN (polyacrylonitrile), PEN (polyethylene naphthalate), PTFE (polytetrafluoroethylene), PVDF (polyvinylidene fluoride or polyvinylidene difluoride), FEP (Fluorinated ethylene propylene), PE (polyethylene, polythene, polyethene, or poly(methylene)), and PP (polypropylene). Exemplary embodiments of cores include (a) a 2000 denier polyester core that has a radius of 0.011 inches, (b) a 3000 denier polyester core that has a radius of 0.013 inches, and (c) a 4000 denier polyester core that has a radius of 0.016 inches.

The wrapping yarns 24 may each consist of a yarn having a Young's modulus greater than 70 GPa and a strength greater than 2.5 GPa. Aramid yarn is a suitable material for the wrapping yarns 24. Other suitable materials for the wrapping yarns 24 include PBO (polybenzobisoxazole), glass, Vectran (an aromatic polyester produced by the polycondensation of 4-hydroxybenzoic acid and 6-hydroxynaphthalene-2-carboxylic acid), PIPD (poly diimidazo pyridinylene dihydroxy phenylene or M5), HPPE (high performance polyethylene), and carbon fiber. Exemplary embodiments of wrapping yarns include (a) a 1500 denier aramid yarn that has a radius of 0.009 inches and (b) a 3000 denier aramid yarn that has a radius of 0.013 inches. The aramid yarns may be TWARON brand aramid yarns.

Figure 3A:
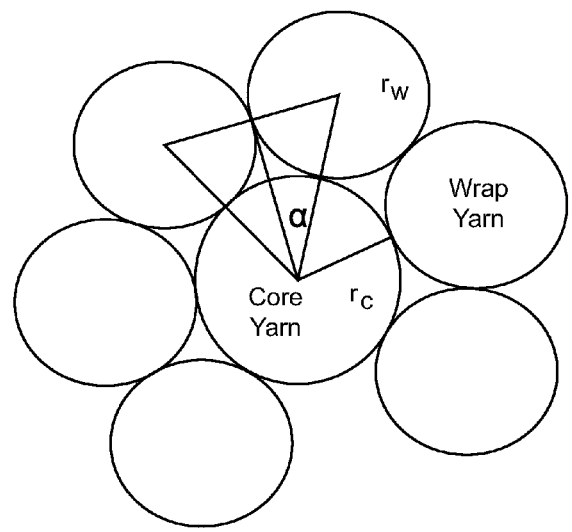
FIG. 3A is another schematic cross-sectional view of another exemplary cord that is annotated to illustrate an equation used to calculate the maximum number of wrapping yarns that can be included in a single layer around a core yarn.
Figure 3B:
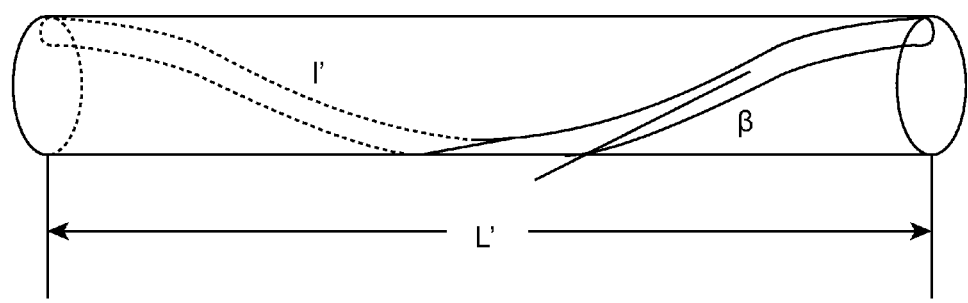
FIG. 3B provides additional context for the equation used to calculate the maximum number of wrapping yarns that can be included in a single layer around a core yarn.

Although the cord 20 is shown with five yarns 24 wrapping the core 22, other numbers of wrapping yarns can be used. To obtain the highest overall cord strength for a given cord diameter, the maximum number of wrapping yarns 24 that can be included in a single layer around the core yarn 22 can be used. The maximum number of wrapping yarns 24 that can be included in a single layer around a core yarn 22 is given by the following formula with reference to FIGS. 3A and 3B:

$$\text{Max Wrap Yarns} = \cos \beta \cdot \pi / \alpha$$

where
 $\beta = \tan^{-1}(\pi \cdot T \cdot 2 \cdot [r_w + r_c])$
 $\alpha = \sin^{-1}(r_w / [r_w + r_c])$
 T=twists per inch
 $r_c$=radius of core yarn
 $r_w$=radius of wrapping yarn For example, using a 2000 denier polyester core yarn, five 1500 denier aramid wrapping yarns, and a desired T of 4.1 twists per inch,
 $r_c$=0.011 in.
 $r_w$=0.009 in.
 T=4.1 twists per inch $$\beta = \tan^{-1}(\pi \cdot T \cdot 2 \cdot [r_w + r_c]) = 27.3° = 0.476 \text{ rad}$$

$$\alpha = \sin^{-1}(r_w / [r_w + r_c]) = 26.7° = 0.467 \text{ rad}$$

and the maximum number of wrapping yarns that can be included in a single layer around a core yarn in that example is given by cos β·π/α=5.98; thus 5 is the maximum number of yarns that can be wrapped around the selected core in this example.

Using a maximum number of high modulus wrapping yarns around a low modulus core allows breaking strength and modulus of the cord to be optimized without increasing final cord diameter. If even higher tensile strength is required, a larger core yarn may be used and the corresponding maximum number of wrapping yarns may be increased. Increasing the denier of the wrapping yarns will also increase the tensile strength of the cord.

Twisting the Cord

A number of processes can be used to make cords comprising a low modulus yarn core that is wrapped by a plurality of high modulus yarns, e.g., cords with aramid yarns wrapping a polyester core. Unlike other cords, yarn twist is selected without matching the moduli of the different yarns.

Two exemplary twisting processes for twisting hybrid cords are set forth below:

Twisting Process 1

In a first exemplary process, a twister (such as a ring twister, a two for one twister, or a flyer twister) is used to manufacture a fully twisted greige cord. In a first stage the low modulus core yarn is twisted using a twist multiplier (TM) of 0 to 8 (calculated using TM=0.01372·T·(denier)$^{1/2}$, where T is the number of twists per inch). In a second stage, the high modulus wrap yarns are then twisted around the core in the opposite direction (with respect to the first wrapping) and again using a TM of 0 to 8 (calculated the same way). The lengths of the wrap yarns to the core yarn are in the range of 0.5% to 5.0% (the untwisted lengths of the wrap yarns are a little longer than the untwisted length of the core yarn), which length difference is achieved by either one of the following two methods:

1. Creating a tension difference between the core and wrapping yarns of 0.005 to 1.0 grams/denier during the second stage; or
2. Using a feed rate difference between the core yarn and the wrapping yarns in the range of 0.5% to 5.0% during the second stage.

In general, with Twisting Process 1, the wrapping yarns are pre-twisted with a TM of 0.0 to 6.0, the core yarns are pre-twisted with a TM of 0.0 to 6.0, and the final twist TM is 2.0 to 6.0 (using the Wellington Sears calculation method, set forth above).

Twisting Process 2

Figure 4:
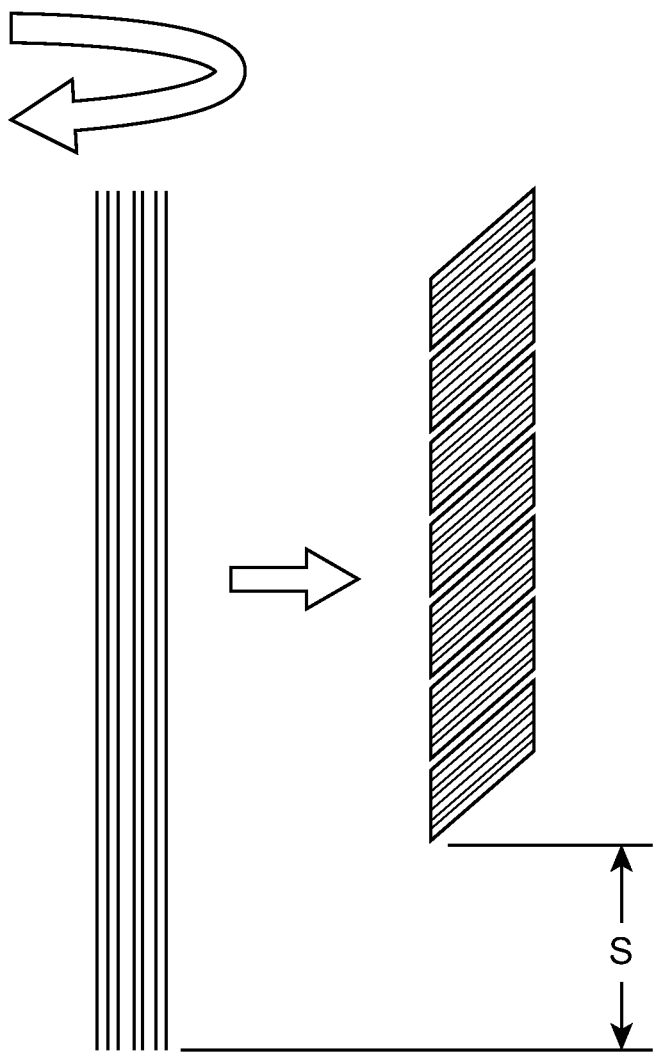
FIG. 4 defines the yarn length contraction "S" for twisting processes.

As seen in FIG. 4, when a yarn is twisted, its overall length decreases by some amount S in the Z direction. Likewise when a twisted yarn is untwisted its length increases by an amount S in the Z direction. This can be used to make cords according to the present application.

In a second exemplary process, a twister (such as a ring twister, a two for one twister, or a flyer twister) is used to manufacture a fully twisted greige cord. Two types of yarns are twisted together on the twister. The first yarn is the core, which has zero twist. The second yarns are the wrapping yarns, which have a TM of 0 to 8 in either the S or Z direction. Both yarns are twisted on the twister and combined with a TM of 0-8 in the opposite direction (with respect to the wrapping yarns). When the core yarn is twisted it shrinks as shown in FIG. 3C. When the wrapping yarns are twisted in the second or combining stage (in the opposite twisting direction of the first stage) their length increases. This combined yarn structure forces the wrapping yarns to wrap around the core yarn because of their greater length. This combined structure keeps the core yarn at the core because of its shorter length. In this process the untwisted length of the core yarns to the wrapping yarns is 0.5 to 5.0%.

In general, with Twisting Process 2, the core is not pre-twisted, the wrapping yarns are pre-twisted with a TM of 2.0 to 6.0, and the final twist TM is 2.0 to 6.0 (using the Wellington Sears calculation method, set forth above).

After twisting (using either Twisting Process 1 or Twisting Process 2 or some other process), the residual twist for the hybrid cords can be in the range of from 1.0 to 7.0 twists per inch in the core yarn and 2.0-8.0 twists per inch in the wrapping yarns. The final twisting process can be in the range of 1.0-7.0 twists per inch.

Cord Heat Treatment

After twisting the low modulus yarn core and the plurality of high modulus wrapping yarns to form a greige cord (using either Twisting Process 1 or Twisting Process 2 or some other process), the cord is treated by heating the greige cord under load to increase the Young's modulus of the cord without significantly decreasing its breaking strength. More specifically, the greige cord is loaded with about 0.1 to about 3 grams per denier tension and heated at a temperature of about 100° C. to about 235° C. for about 25 seconds to about 150 seconds in an oven, e.g., the greige cord is treated with the process conditions outlined for ES1551 or RF2161 or ES1549 in Table 5.

This Cord Heat Treatment allows the modulus of a hybrid cord to change during processing to approach the modulus of the 100% aramid material. Table A, below, shows the effect of the Cord Heat Treatment on a control cord (Aramid 1500×2×3) and three hybrid cords:

TABLE A

| | Greige Cord | | | | | | |
|---|---|---|---|---|---|---|---|
| ID | Description | Total Denier | Free Shrinkage % | Shrinkage Force lb | Breaking Strength lb | Elongation at Break | LASE3 lb |
| RF2261 | Aramid 1500 × 2 × 3 | 9,000 | — | — | 366.5 | 4.3% | 200.6 |
| ES1551 | PET/Aramid Hybrid 2000 PET core, 5 × 1500 Aramid wrap | 9,500 | — | — | 353.3 | 5.1% | 152.9 |
| ES1549 | PET/Aramid Hybrid 4000 PET core, 6 × 1500 Aramid wrap | 13,000 | — | — | 388.7 | 6.4% | 96.0 |
| RF2161 | PET/Aramid Hybrid 3000 PET core, 4 × 3000 Aramid wrap | 15,000 | — | — | 422.4 | 6.5% | 98.0 |

| | After Cord Treatment | | | | | | | |
|---|---|---|---|---|---|---|---|---|
| ID | Description | Total Denier | Free Shrinkage % | Shrinkage Force lb | Breaking Strength lb | Elongation at Break | LASE3 lb | % Change LASE3 |
| SC1119 | Aramid 1500 × 2 × 3 | 9,000 | — | — | 378.7 | 3.8% | 289.8 | 44.5 |
| ES1551 | PET/Aramid Hybrid 2000 PET core, 5 × 1500 Aramid wrap | 9,500 | 2.7% | 3.0 | 325.5 | 3.8% | 240.6 | 57.4 |
| ES1549 | PET/Aramid Hybrid 4000 PET core, 6 × 1500 Aramid wrap | 13,000 | 4.3% | 4.4 | 406.0 | 5.2% | 197.4 | 105.6 |
| SC1223 | PET/Aramid Hybrid 3000 PET core, 4 × 3000 Aramid wrap | 15,000 | — | 16.0 | 419.8 | 4.3% | 291.0 | 197.0 |

RF2261 is the identifier for the greige cord for the SC1119 hybrid cord. RF2161 is the identifier for the greige cord for the SC1223 hybrid cord. The "Aramid 1500×2×3" RF2261 control in Table A was made from 1500 denier aramid base yarn and twisted as follows: 2 plies of 1500 denier yarn were twisted at 4.6 tpi in the Z direction and 3 strands of 1500×2 yarn were twisted in a second twist operation with 4.6 tpi in the S direction.

In Table A, Total Denier is the denier for the cord (as a whole), Free Shrinkage is a length change measured by exposing untensioned cord for 3 minutes at 175° C. in a hot air oven, Shrinkage Force is measured on a Testrite® tester by heating a cord at 110° C. for 2 minutes with a pretension of 0.1 g per denier, Breaking Strength is the breaking strength (in pounds) of the cord measured on an Instron® or MTS® tensile tester, and LASE3 is a measurement of load at 3 percent elongation measured on an Instron® or MTS® tensile tester. The LASE3 value correlates to Young's modulus. The "Pet/Aramid Hybrid 2000 PET core, 5×1500 Aramid Wrap" cord was made in accordance with the present application using Twisting Process 2 on a 2000 denier polyester core yarn and 5 each 1500 denier aramid wrap yarns ("hybrid cord") and corresponds to Example 1 (ES1551) below. Similarly, RF2161/SC1223 corresponds to Example 2 and ES1549 corresponds to Example 3, below. A "-" in Table A indicates that the value was not measured.

As can be seen from Table A, after the cord heat treatment the breaking strength of two of the hybrid cords dropped a little, but the Young's modulus value (LASE3) of the hybrid cords increased significantly and actually increased more than the aramid control cord. Although not wanting to be bound by theory, it is believed that the Cord Heat Treatment affects the cord to achieve these positive effects by allowing the lower modulus core yarns to stretch sufficiently for the higher modulus wrapping yarn modulus to become dominant, i.e., it is believed that the Cord Heat Treatment permits the lower modulus core yarns to stretch in the range of 1.0 to 10.0% so that the higher modulus wrapping yarns carry a load proportional to their denier and modulus. The level of elongation of the low modulus core of the hybrid yarns is seen in the difference between the elongation at break, or failure strain, of the greige cord and the after treatment cord.

EXAMPLES

Three exemplary cords, Examples 1-3, are shown in Table 1, below:

TABLE 1

Examples 1-3

| Ex | Core Material | Core Yarn Denier | Radius Core (in) | Wrap Material | Wrap Yarn Denier | Radius Wrap (in) | # of Wrap Yarns | yarn tpi | final tpi | Total Denier |
|---|---|---|---|---|---|---|---|---|---|---|
| 1 ES1551 | Polyester | 2000 | 0.011 | Twaron Aramid | 1500 | 0.009 | 5 | 6 | 4.1 | 9500 |
| 2 RF2161 | Polyester | 3000 | 0.013 | Twaron Aramid | 3000 | 0.016 | 4 | 4.4 | 3.4 | 15000 |
| 3 ES1549 | Polyester | 4000 | 0.016 | Twaron Aramid | 1500 | 0.009 | 6 | 6 | 3.8 | 13000 |

In the exemplary cords of Examples 1-3, there is one (1) single core yarn assembly wrapped by the indicated number of wrapping yarns. The polyester core yarn has a Young's modulus of about 14 GPA. The aramid wrapping yarns have a Young's modulus of about 74 GPa. The cords of Examples 1-3 were twisted using Twisting Process 2. Example 1 (ES1551) has a residual twist in the wrapping yarns of 1.9 tpi Z, Example 2 (RF2161) has a residual twist in the wrapping yarns of 1.0 tpi Z, and Example 3 (ES1549) has a residual twist in the wrapping yarns of 2.2 tpi Z.

Table 2 shows the various twist multipliers used in Examples 1-3:

TABLE 2

| Description | Identifier | yarn tm | yarn tm ara | final tm | final tm ara | final tm pet | Thickness |
|---|---|---|---|---|---|---|---|
| Aramid/Polyester Hybrid | ES1551 | 3.19 | 3.42 | 5.48 | 5.88 | 5.47 | 0.047 |
| Aramid/Polyester Hybrid | RF2161 | 3.31 | 3.54 | 5.71 | 6.12 | 5.70 | 0.061 |
| Aramid/Polyester Hybrid | ES1549 | 3.19 | 3.42 | 5.94 | 6.37 | 5.94 | 0.056 |

In Table 2, "yarn tm" is the twist multiplier for the first twisting process of the aramid wrapping yarn using the formula, $TM = 0.01372 \times denier^{1/2} \times tpi$, "yarn tm ara" is the twist multiplier for the aramid wrapping yarns using the formula, $TM = tpi \times denier^{1/2}/68$, "final tm" is the final twist multiplier for the final twisted greige cord using the formula, $TM = 0.01372 \times denier^{1/2} \times tpi$, "final tm ara" is the final twist multiplier of the final twisted greige cord using the formula, $TM = tpi \times denier^{1/2}/68$, "final tm pet" is the final twist multiplier of the final twisted greige cord using the formula, $TM = tpi \times denier^{1/2}/73$, and "thickness" is the final thickness (diameter) of the greige cord in inches. This Table 2 shows there is very little difference between the preferred formula $TM = 0.01372 \times denier^{1/2} \times tpi$ and the alternate formulas.

Table 3 shows the calculated maximum number of wrapping yarns that could be included in a single layer around the core yarn in Examples 1-3. As can be seen, Example 1 used the calculated maximum number of wrapping yarns that can be included in a single layer around the core yarn (five wrapping yarns), but Examples 2 and 3 used one wrapping yarn fewer than the maximum number of wrapping yarns that could be included in a single layer around a core yarn (four wrapping yarns instead of five in Example 2 and six instead of seven in Example 3).

TABLE 3

| Ex | Identifier | Number Of Warp Yarns | yarn tpi | final tpi | Total Denier | Beta | Alpha | Max Yarn Calculation | Max Yarn Integer |
|---|---|---|---|---|---|---|---|---|---|
| 1 | ES1551 | 5 | 6 | 4.1 | 9500 | 0.476 | 0.467 | 5.983 | 5 |
| 2 | RF2161 | 4 | 4.4 | 3.4 | 15000 | 0.510 | 0.507 | 5.404 | 5 |
| 3 | ES1549 | 6 | 6 | 3.8 | 13000 | 0.530 | 0.375 | 7.222 | 7 |

Table 4, below, shows the ply length difference between the wrap yarns and the core yarn for Examples 1-3. In each example, the wrapping yarns are slightly longer than the core yarn.

TABLE 4

| Description | Example | Identifier | Ply Length Difference Between Wrap and Core |
|---|---|---|---|
| Aramid/Polyester Hybrid | 1 | ES1551 | 0.87% |
| Aramid/Polyester Hybrid | 2 | RF2161 | 2.32% |
| Aramid/Polyester Hybrid | 3 | ES1549 | 2.03% |

The cords of Examples 1-3 were heat treated using the Cord Heat Treatment discussed above with the tension (pounds), time (seconds), and temperature (degrees F.) shown in Table 5, below:

TABLE 5

| Identifier | Ex | Zone 1 Expos s | Zone 2 Expos s | Zone 3 Expos s | Zone 1 Temp F. | Zone 2 Temp F. | Zone 3 Temp F. | Zone 1 Tension | Zone 2 Tension | Zone 3 Tension |
|---|---|---|---|---|---|---|---|---|---|---|
| ES1551 | 1 | 99 | 79 | 79 | 380 | 240 | 450 | 6 | 12 | 15 |
| RF2161 | 2 | 111 | 87 | 66 | 360 | 240 | 450 | 5 | 12 | 25 |
| ES 1549 | 3 | 132 | 105 | 105 | 380 | 240 | 450 | 6 | 12 | 22 |

In Table 5, the different zones represent three independent hot air ovens with capabilities to independently control cord tension in each oven. Table 5 represents a three zone process for V Belt cords. The first oven and tension zone (Zone 1) is used for the application and curing of a first adhesive, typically epoxy or isocyanate. The second oven and tension zone (Zone 2) is used for the application of a resorcinol formaldehyde latex (RFL) and the drying of that adhesive. The third oven and tension zone (Zone 3) is used to react the RFL adhesive. Heat treating temperatures and exposure are determined experimentally to achieve optimal adhesion of the cords to rubber. There is a direct relationship between third zone tension and shrinkage force. Load is selected to attain a desired level of shrinkage force. In these examples, a load during heat treatment in Zone 3 of about 0.7 to about 0.8 grams per total greige cord denier was applied. The third zone (Zone 3) exposure time, temperature, and tension are the primary factors influencing the properties listed in Table 6, below.

The data shown above in Table 1 (Free Shrinkage %, Shrinkage Force lb, Breaking Strength lb, and LASE3 lb), indicating the effects of the heat treatment, are shown in Table 6, below, for all three Examples:

TABLE 6

| Identifier | Ex | Free Shrinkage % | Shrinkage Force lb | Breaking Strength lb | LASE3 lb |
|---|---|---|---|---|---|
| ES1551 | 1 | 2.7 | 3.0 | 325.5 | 240.6 |
| RF2161 | 2 | — | 16.0 | 419.8 | 291.0 |
| ES1549 | 3 | 4.3 | 4.4 | 406.0 | 197.4 |

Belts Made with Hybrid Cords

The hybrid cords discussed above can be used in the manufacture of elastomeric articles such as endless power transmission belts.

Figure 6:
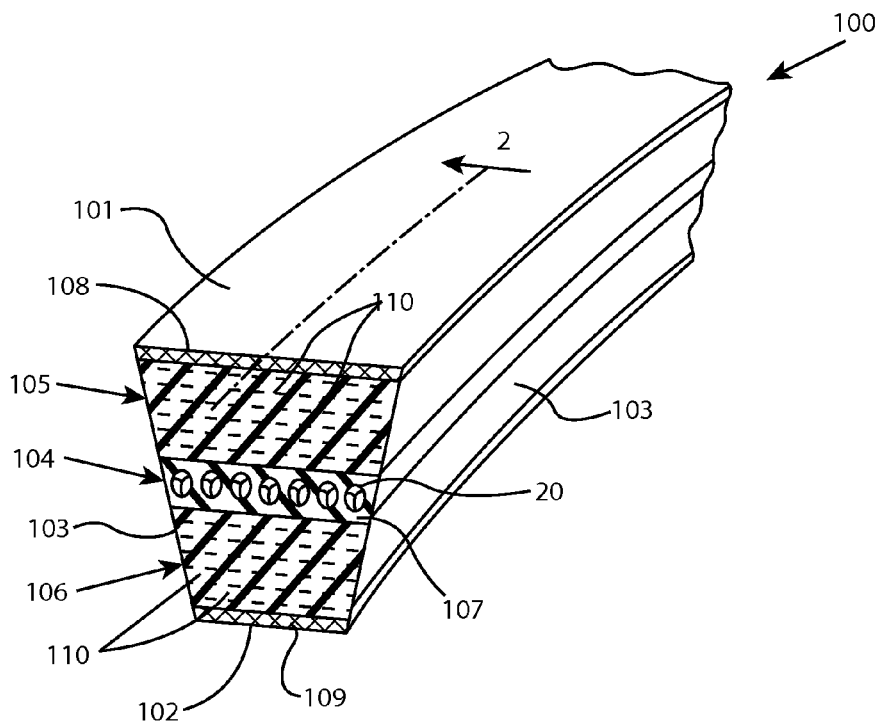
FIG. 6 is a perspective cross-sectional view illustrating one exemplary embodiment of an endless power transmission belt.
Figure 7:
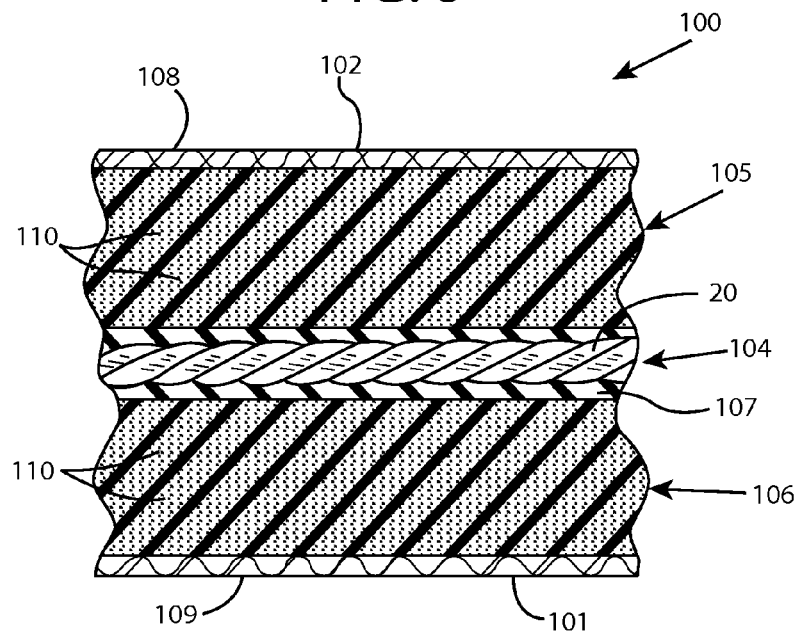
FIG. 7 is an enlarged transverse cross-sectional view taken along 2-2 of FIG. 6.

Reference is now made to FIGS. 6 and 7 of the drawings which illustrate an exemplary embodiment of an endless power transmission belt structure or belt of this disclosure. The belt structure or belt is designated generally by the reference numeral 100. Such belt 100 has trapezoidal cross-section and may often be referred to as a V-belt. The belt 100 has a pair of opposed parallel surfaces, which when viewed in cross-section, are defined by an outside surface 101 and an inside surface 102 with the parallel surfaces 101 and 102 being connected at their opposite edges by symmetrically arranged side surfaces 103. The side surfaces 103 define the non-parallel sides of the trapezoidal cross-section of belt 100.

Belt 100 has a load-carrying section 104 arranged midway between the outside surface 101 and the inside surface 102. Because the practice in the industry is to refer to the load-carrying section 104 as the neutral axis of the belt, the positioning of the load-carrying section 104 midway between surfaces 101 and 102 results in what may be referred to as belt 100 having a central neutral axis. The belt 100 also includes a tension section 105 and a compression section 106. The load-carrying section 104 is disposed between tension section 105 and compression section 106.

The load-carrying section 104 has, as its load-carrying means, the comparatively highly twisted helically wound load-carrying cord 20 disclosed herein. In accordance with this embodiment, the belt 100 containing cord 20 has improved performance, including but not limited to improved resistance to flex induced fatigue failure (i.e., longer Flex Life) and lower degradation of tensile strength.

Cord 20 is suitably embedded in an elastomeric cushion 107 in accordance with techniques known in the art. The cushion 107 comprises the load-carrying section 104. The cushion 107 may be made of any suitable material known in the art such as a soft rubber, for example.

The tension section 105 of the belt 100 has a fabric cover 108 thereon, the outside surface of which defines the outside surface 101 of the belt 100. Similarly, the compression section 106 has a fabric cover 109 thereon the outside surface of which defines the inside surface 102 of the belt 100. The covers 108 and 109 may be made employing any suitable fabric employed in the art of making belts.

Each of the sections 105 and 106 also has a plurality of fibers oriented parallel to surface 102 and perpendicular to cord 20 embedded therein, a representative few of which are designated by the reference numeral 110. The fibers 110 allow the belt 100 to be operated in its endless path with unimpaired longitudinal flexibility while providing transverse rigidity or stiffness for such belt, i.e., stiffness transverse the longitudinal axis of the belt. The fibers 110 may be made of any suitable material known in the art.

Each of the sections 104, 105, and 106 of the belt 100 is preferably made primarily of a polymeric material in the form of a rubber compound with the only exceptions being the fibers 110, fabric covers 108 and 109, and the cord 20. Any suitable rubber or rubber compound disclosed herein may be used with the embodiments of the belts disclosed herein.

Figure 8:
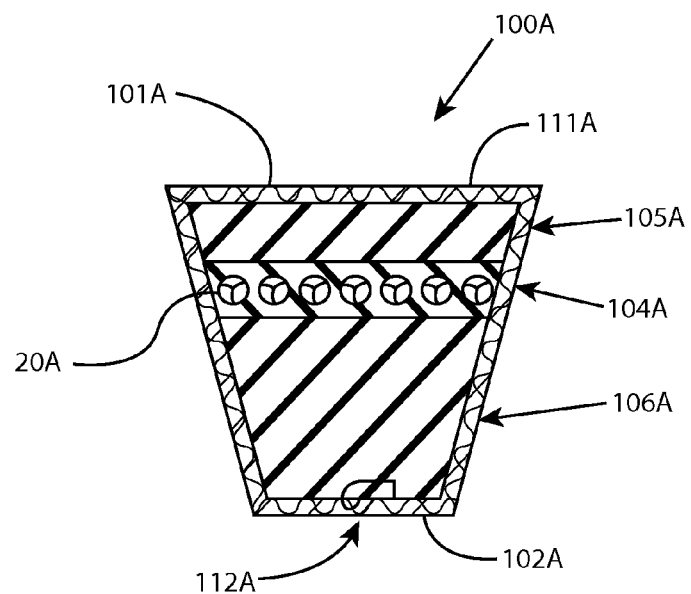
FIG. 8 is a cross-sectional view of another exemplary embodiment of an endless power transmission belt.

Another exemplary embodiment of the belt structure or belt of this invention is illustrated in FIG. 8 of the drawing. The belt illustrated in FIG. 8 is very similar to the belt 100; therefore, such belt is designated by the reference numeral 100A, and representative parts of the belt 100A that are similar to corresponding parts of the belt 100 are designated in the drawing by the same reference numerals as in the belt 100 (whether or not such representative parts are mentioned in the specification) followed by the letter designation "A" and not described again in detail. Only those parts of the belt 100A which are substantially different from the belt 100 are designated by a new reference numeral, also followed by the letter designation "A" and described in detail below.

The belt 100A of FIG. 8 has a tension section 105A, a load-carrying section 104A, and a compression section 106A. A primary difference between belt 100A and belt 100 is that belt 100A has its load-carrying section 104A disposed closer to its outside surface 101A than to its inside surface 102A as compared to the load-carrying section 104 with respect to the corresponding surfaces 101 and 102 in belt 100. The belt 100A also has a fabric cover designated by the reference numeral 111A which extends completely around the periphery of the belt as shown in the in cross-section of FIG. 8 and has an overlapping inside surface as indicated at 112A. This type of belt 100A may often be described as a "wrapped belt." However, the belt 100A is not limited to wrapped belts and instead may have raw-edged non-parallel sides in a similar manner as the belt 100 described herein. Further, both exemplary belts 100 and 100A may be raw-edged or without covers about their entire peripheries.

Figure 10:
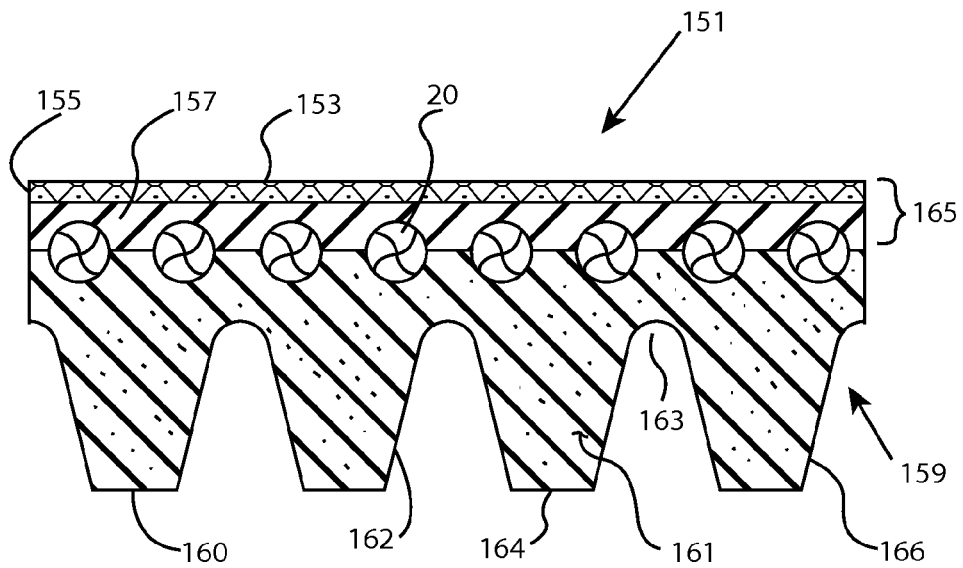
FIG. 10 is a transverse cross section of a multi-V-ribbed belt used in the accessory drive system of taken along 2-2 of FIG. 11.
Figure 11:
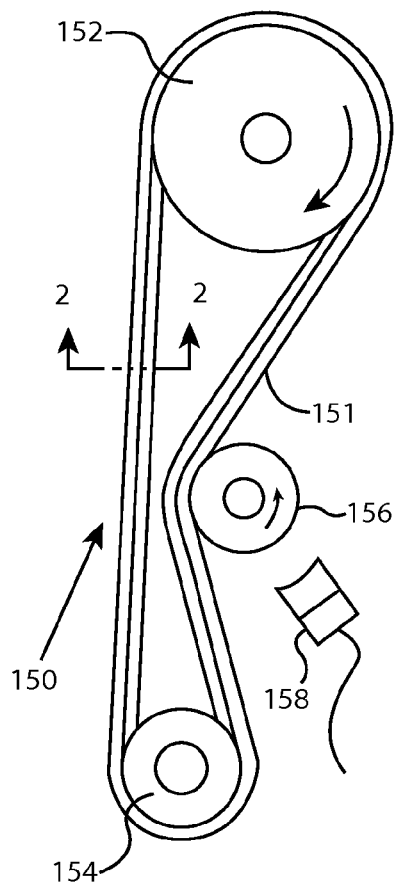
FIG. 11 is a simplified engine accessory drive system utilizing a multi-V-ribbed belt of FIG. 10.

Referring first to FIGS. 10 and 11 of the drawings, in accordance with other exemplary embodiments, an engine accessory drive system is shown generally at 150, consisting of an engine crankshaft pulley 154, and a driven pulley 152 linked in driving relationship by a four-ribbed serpentine belt 151 that contains the cords 20 disclosed herein. The top or exterior back surface 153 of belt 151 makes contact with idler pulley 156. The drive system 150 of FIG. 11 may be used as a simple automotive accessory drive system, an industrial drive, or a test apparatus for measuring noise generated at the interface between belt 151 and backside idler pulley 156 through sensor/transducer 158 (measuring dB's (decibels) and noise characteristics). The particular application and type of drive system will be dictated by the type of belt configuration chosen. Generally the cords of this disclosure may be applied to V-belts, flat belts, multi-V-ribbed belts and synchronous belts. An example of a common automotive front end accessory drive system in which the belt of the invention may be used is illustrated and disclosed in U.S. Pat. No. 4,551,120, which consists of a main driving pulley operatively connected to an air conditioning motor pulley, an alternator pulley, an engine air pump pulley, and a water pump pulley. The multi-V-ribbed belt trained about these pulleys is kept in appropriate tension through a tensioner having a surface engaging the backside of the belt.

The belt of FIG. 10 is formed of a rubber body. As used herein, "rubber" or a "rubber compound" refers to a cross-linkable natural or synthetic rubber which is processable in solid form, e.g., on a mixing mill. Such rubber is typically mixed in a green or unvulcanized form with appropriate additives, extenders, reinforcements, accelerators, fillers, vulcanizing agents such as sulfur and peroxides, and the like in a Banbury® mixer, or continuous mixer, as is well known in the rubber processing industry. Layers or calendared sheets of stock are then ready to be built up in layered form with textile reinforcement and the like, the green reinforced rubber in sleeve or other form is vulcanized or cured under heat and pressure. If cured in sleeve form, individual belts may be cut from the sleeve. Typical synthetic rubbers useful in the invention include polychloroprene, copolymers of ethylene and propylene, terpolymers of ethylene, propylene and diene monomers such as EPDM, styrene butadiene rubber, HNBR, CSM, silicone rubber, fluoroelastomers, mixtures of the foregoing, and alloys or mixtures of the foregoing or other known solid-processable rubbers mixed with suitable thermoplastic or thermosetting polymers or "plastomers", polyethylene, polyester (e.g., Hytrel trademark) or materials such as Santoprene (Monsanto trademark). Liquid processable elastomeric materials such as those formed by liquid casting, applicable to many forms of polyurethane, are not within this definition and are not contemplated by the embodiments of the invention disclosed herein.

The belt of FIG. 10 is a four-ribbed serpentine belt employing a cord 20 as disclosed herein, which is embedded in the rubber body of the belt. The cord members 20 may be any of the hybrid cords discussed above or below. The undercord section 159 of the belt may be formed of an unloaded rubber stock; however, typically it is formed of a suitable rubber in which has been mixed loading of discrete reinforcement fibers 161 of desired material such as cotton, polyester or aramid. The multiple ribs of the undercord section shown at 160, 162, 164, 166 may be formed by grinding away the fiber loaded rubber between adjacent ribs, up to the apex 163 between adjacent ribs, or by molding, fly cutting or other suitable techniques. The shape and configuration of the ribs is normally substantially matched to the corresponding shape of the pulleys 152 and 154 about which the belt is linked in driving relationship.

The overcord section of the belt shown at 165 includes a generally flat exterior belt back surface 153, a textile overcord material 155 positioned at the exterior belt back surface, and an interposed rubber layer such as adhesion gum layer 157 which is selected to adhere to the textile material 155 as well as the adjoining cords 20. The adhesion gum layer 157 may be formed of the same or similar (compatible) rubber material as utilized in the undercord section 159 to ensure proper adhesion and integration into the composite belt structure.

Figure 9:
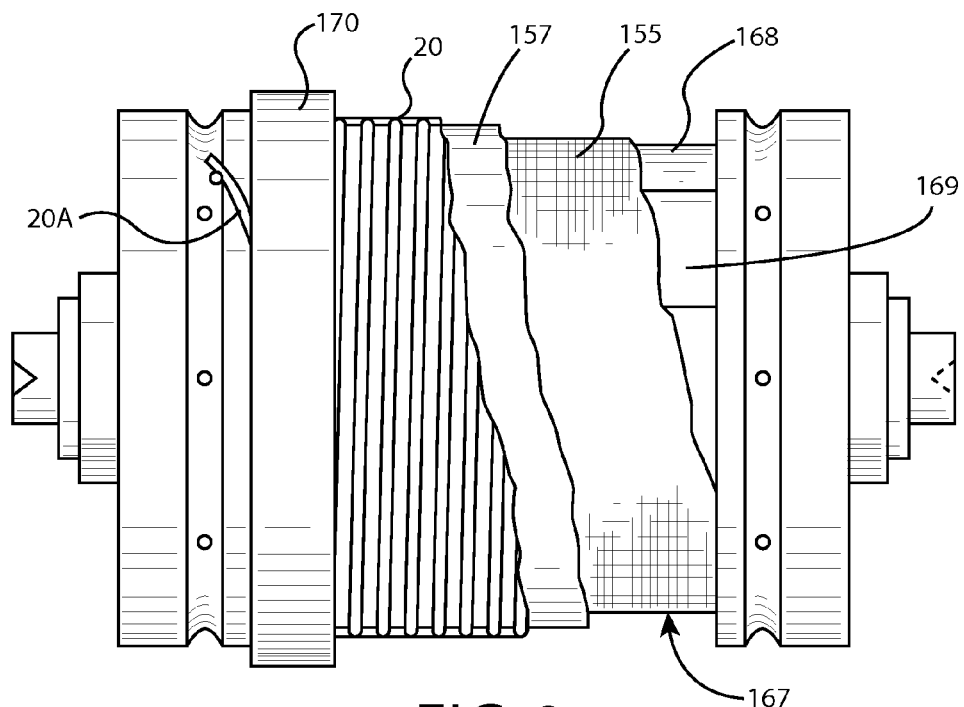
FIG. 9 illustrates a partial cut-away of a belt building drum (mandrel) showing the different layered components assembled on the drum to construct a belt sleeve.

A method of forming the belt of FIG. 10 will be discussed in relation to the apparatus of FIG. 9. On to a building drum 168 is first applied, optionally, an elongated transfer label 169 upon which is imprinted any desired indicia, e.g., product numbers, trademarks, country of origin, to be imparted to back surface 153 of the belt. This transfer label typically is a relatively thin film of Mylar or other plastic material bearing heat or pressure sensitive ink printing which during vulcanization is transferred from the Mylar backing to the back surface 153 of the belt. As the belt is built inverted, the next layer applied on the drum is back surface 153 which includes a layer 167 of textile material 155 applied as a sheet over the mandrel 168 as mandrel 168 rotates. Although it has been found satisfactory to employ a single textile layer 167, obviously depending on the application, two or more layers could advantageously be used, with any intervening rubber layer applied as dictated by the application.

Over the layer 167 of textile material 155 is wrapped one or more layers of a rubber (e.g., elastomer) such as adhesion gum rubber 157. Preferably the ends of the layer(s) are butt spliced to avoid a lap which might otherwise be reflected as a protrusion or bump in the outer surface 153 of the belt. This gum layer 157 may alternatively be fiber loaded with any suitable reinforcement fiber such as cotton, polyester or aramid, or may itself include one or more textile reinforcing layers embedded therein. Onto gum layer 157 is applied, by helically winding, strain-resisting tensile cord 20 in typical fashion. The tensile cord may be closely or widely spaced, as needed, and an appropriate amount of winding tension is used, with the ends 20a secured, as shown. Lastly, layer 161 which serves as the undercord of the belt, is wrapped over the helically wound cord 20. This material may be gum stock, or include discrete fiber loading 166 to enhance the modulus of the ribs 160, 162, 164, 166.

Once the sleeve has been built up on drum 168, the assembly may be placed inside a vulcanizing bag with steam pressure introduced to press the bag radially inwardly against the outer surface of the sleeve (against layer 161), consolidating and vulcanizing the sleeve in customary manner. The mold may then be disassembled and the sleeve demolded. The sleeve may then be placed on a grinding drum and the profile of ribs 160, 162, 164, 166 formed with complimentary shaped grinding wheels or flycutters, removing undercord material between the ribs, and up to apices 163. Alternatively, the ribbed profile may be formed by using a matrix airbag during vulcanization on drum 168, where the shape of the airbag is impressed into the overcord section 161. Alternatively, an airbag can be placed over mandrel 170 and the sleeve pressed outwardly during vulcanization against a rigid outer shell member having the conjugate shape of ribs 160, 162, 164, 166 formed in the shell. Various methods of manufacture will be appreciated by those having skill in this art.

With similar modifications the belt of FIG. 10 could also be built upright, rather than inverted. In that case the outermost layer is the textile layer with a further exterior layer of gum rubber thereover.

Exemplary belts were made using the cords of Examples 1-3 using the method described above. These exemplary belts are 95.25 inches in length, which length is simply an example. The belts had the following characteristics: "A" section wrapped molded belts with a polychloroprene core.

Belt Testing Methods

Belt Flex Fatigue Life

Figure 5:
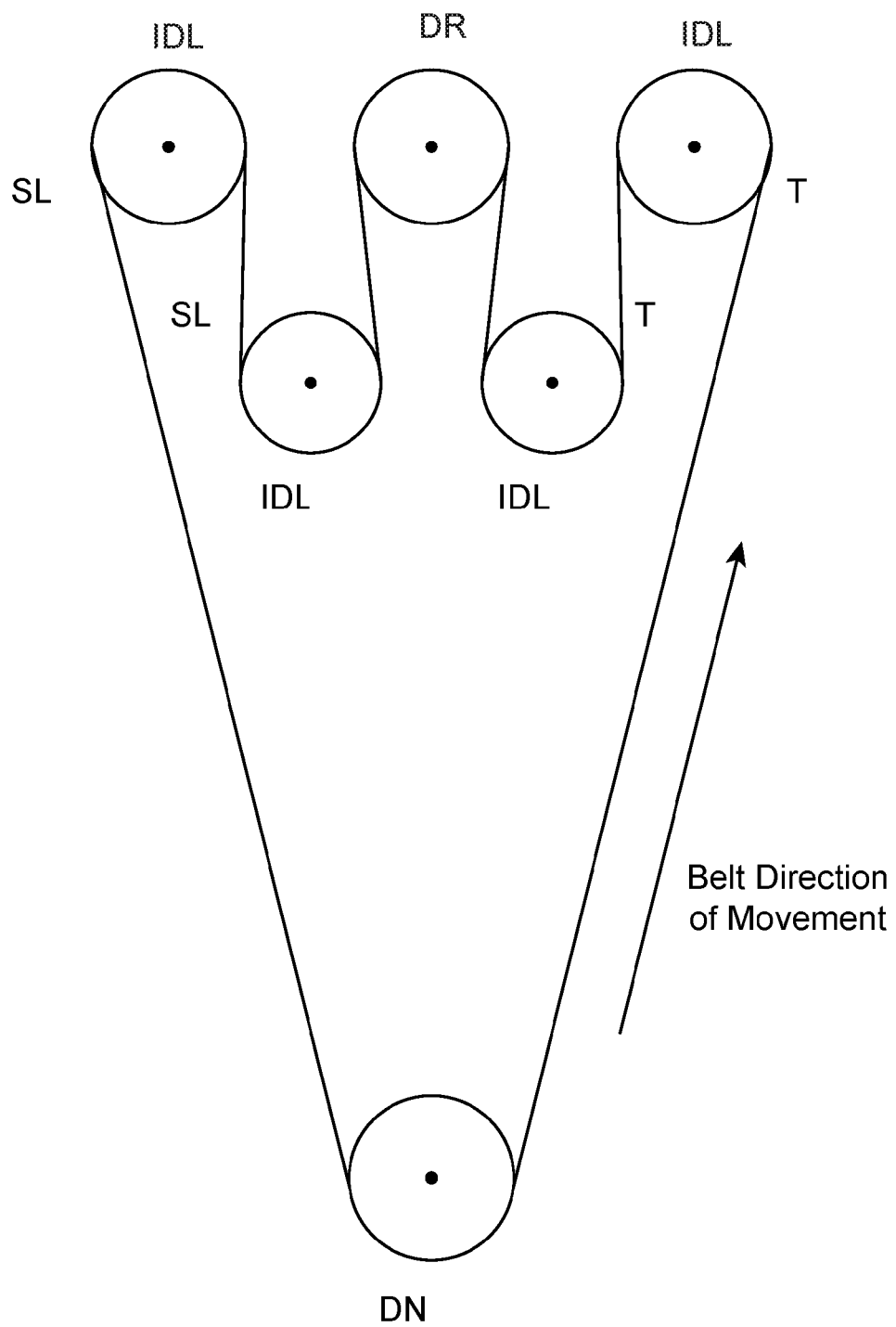
FIG. 5 is a schematic representation of a V-belt test configuration, which is used to test Flex Life and CD Change of V belts made with the cords of the present application.

Flex Fatigue Life, or simply Flex Life is a measurement of belt life in a situation where the belts flex and fail by flexing and is measured on an hour meter on a belt testing device, shown schematically in FIG. 5. Flex Fatigue Life is measured in hours and is determined using a dead weight type of test with a dead weight of 170 pounds and driven at 3300 revolutions per minute (RPM). The elements of FIG. 4 are intentionally misaligned as follows: (a) there is an eighth of an inch (⅛") misalignment between the drive axle DR and the dead weight pulley DN and (b) there is a half-inch (½") misalignment between the drive axle DR and the slack idlers SL and tight idlers T, and (c) there is a five-eighths inch (⅝") misalignment between the idlers IDL and the dead weight pulley DN. This misalignment has the effect of stressing the tensile cord unevenly and accelerating the tensile failure. The belt is set up and run in this configuration until is breaks (complete failure). The period of time from the start of the test until the belt breaks is the Flex Fatigue Life for that belt.

Belt CD Growth

CD Growth is a measurement of the increase in length of a belt as a result of the Flex Fatigue Life test. This is measured by recording the Center Distance change of the belts on a test stand prior to tensile failure. CD Growth is expressed as either an increase in absolute length (e.g., in inches) or as a percentage.

Belt Tensile Strength

Belt Tensile Strength is measured on an Instron® or MTS® Tensile tester using flat pulleys.

Belt Test Results

The exemplary belts discussed above were tested using the test methods described above. The results are set forth below in Table 6, below, along with the same data for two other belts made with two non-hybrid cords. The belt with the "Control 100% Aramid" cord was made as follows and has the following characteristics: "A" section wrapped molded V-Belt using a polychloroprene core. The "(2000 denier Polyester, 1500 denier Aramid)×3 Blended" cord was made by twisting a 2000 denier polyester yarn and a 1500 denier aramid yarn together in a first twisting process. Three of these plies were then twisted in the opposite direction in the final twisting process. This blended cord contrasts with the wrapped core concept of the hybrid cords disclosed herein. The belt with the "(2000 denier Polyester, 1500 denier Aramid)×3 Blended" cord was made as follows and has the following characteristics: "A" section wrapped molded V-Belt using a polychloroprene core.

TABLE 6

| Test Results-Dead Weight Flex Test | Flex Life (hr) | CD Growth (in.) | CD Growth (%) |
|---|---|---|---|
| Control 100% Aramid | 25 | 0.09 | 0.19% |
| Hybrid-4000 denier Polyester Core, 6 × 1500 denier Aramid Wrap | 90 | 0.34 | 0.71% |
| Hybrid-2000 denier Polyester Core, 5 × 1500 denier Aramid Wrap | 60 | 0.19 | 0.40% |
| (2000 denier Polyester, 1500 denier Aramid) × 3 Blended | 94 | 0.45 | 0.94% |

As can be seen, the two "hybrid" belts made with hybrid cords in accordance with the disclosure herein had significantly longer Flex Life than the belt made with the "Control 100% Aramid" cord with less CD Growth than the belt made with the "(2000 denier Polyester, 1500 denier Aramid)×3 Blended" cord.

Figure 12:
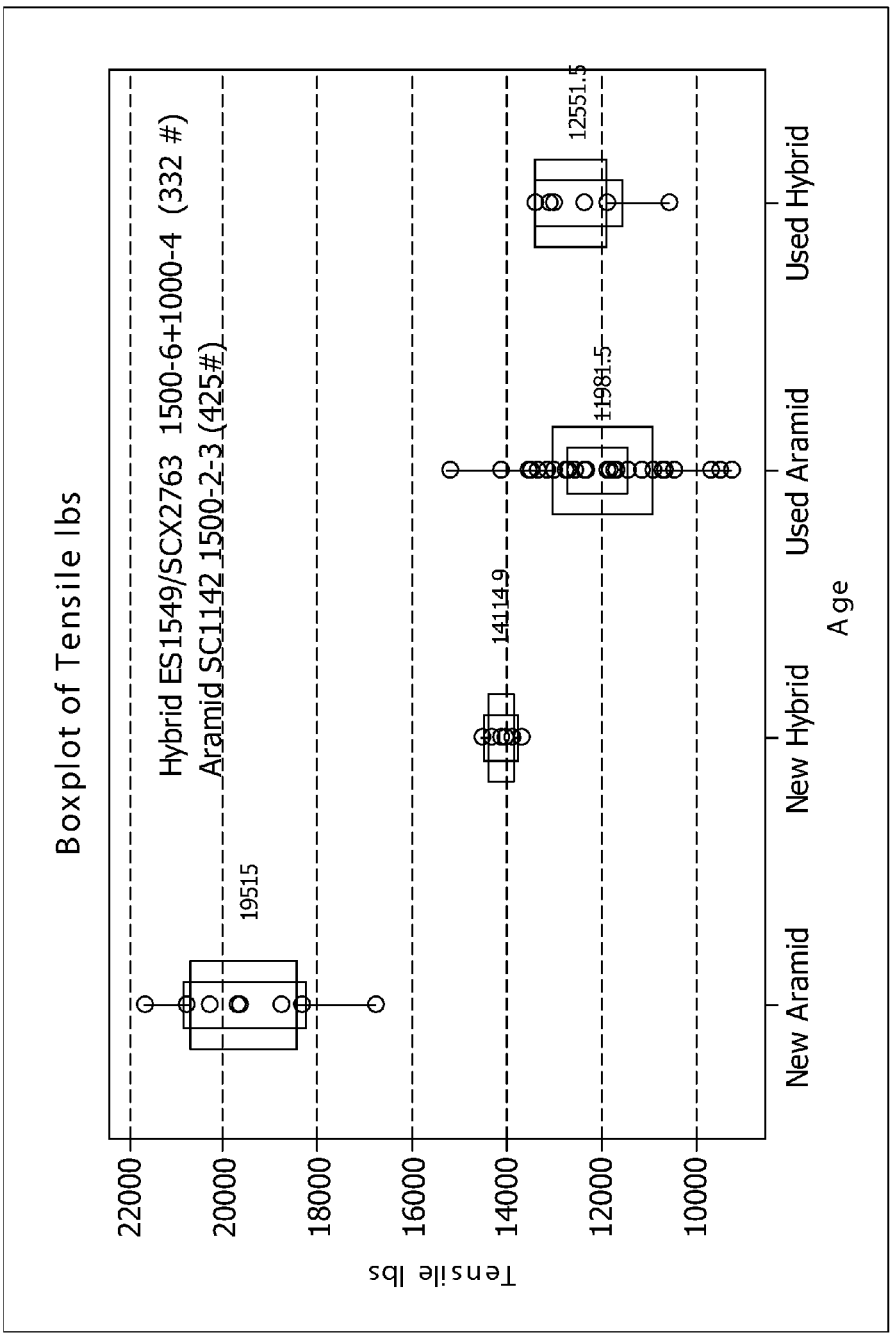
FIGS. 12 and 13 are boxplots showing data from V belts made with a hybrid core in accordance with the present application.
Figure 13:
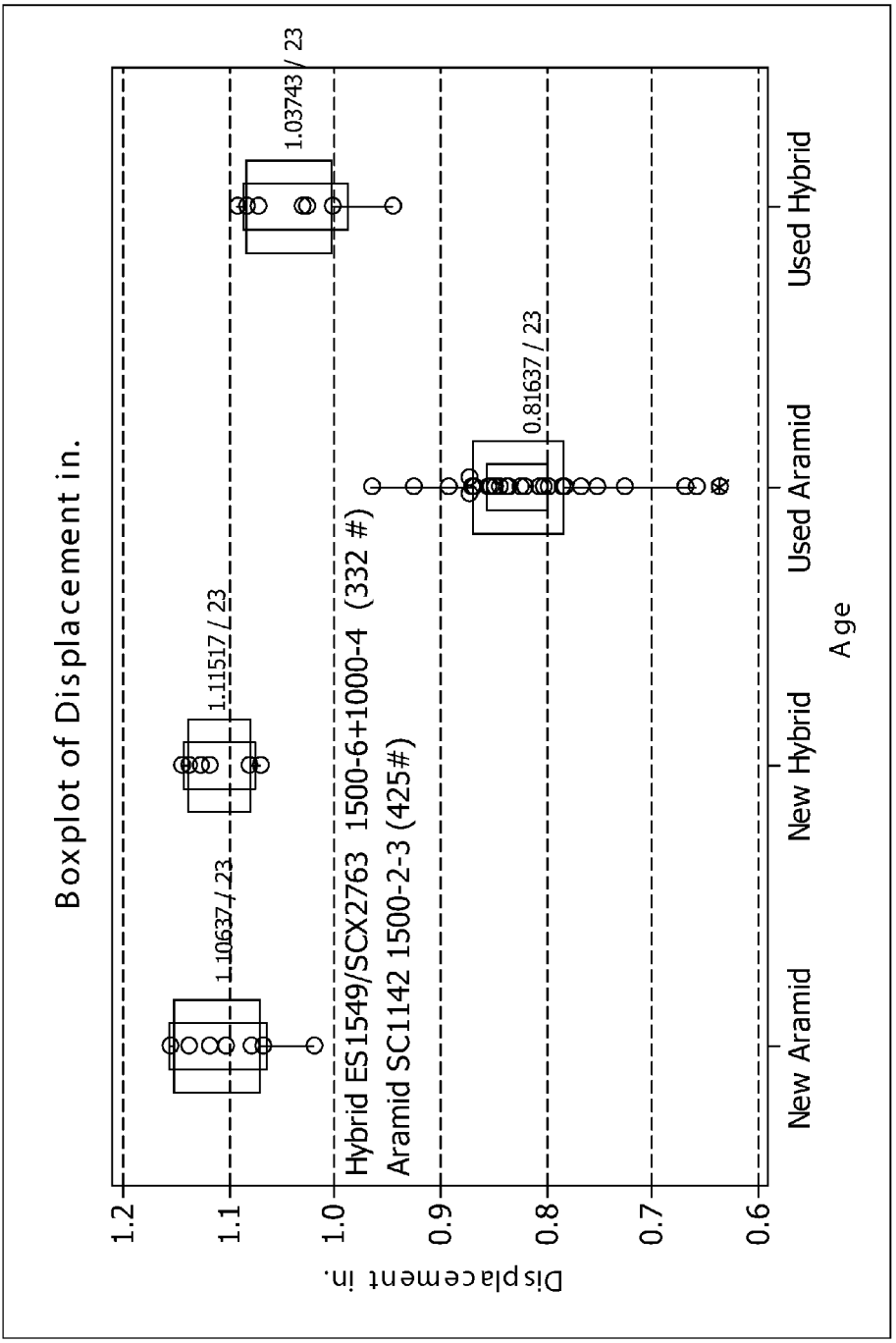

A significant number (about 34) of the belts made with the Example 3 (ES1549) cords were tested in snowmobiles along with the same number of aramid control belts. The control belts were made with the 100% aramid cords (Aramid 1500× 2×3) discussed above in the Cord Heat Treatment section. As can be seen in FIG. 12, the belts made with the hybrid cords showed lower tensile strength degradation during field testing than the 100% aramid cords during harsh testing in snowmobiles. More specifically, the data shown in FIG. 12 indicates that the endless power transmission belts had an average tensile strength degradation of less than 12% after 23 hours of normal use in a snow mobile (e.g., not doing long hill climbs for most of that time). Similarly, as seen in FIG. 13, the belts made with the hybrid cords showed higher displacement or elongation at break after field testing than the 100% aramid cords during harsh testing in snowmobiles (using a CD length of 46.0 in./2). As can be seen, the belts with the hybrid cords had higher retained tensile strength and elongation at break than the belts with the aramid cords. More specifically, the data shown in FIG. 13 shows that the endless power transmission belts had an average displacement degradation of less than 8% after 23 hours of normal use in a snow mobile.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. For example, lower numbers of higher modulus wrapping yarns may be employed than the maximum number and some of the benefits from the invention might still be shown. In addition, the twist of a twisted cord can be determined by untwisting the final cord and untwisting the individual wrapping yarns. After the final twist is removed by untwisting the final cord one can measure yarn lengths of the wrapping yarn(s) and the core yarn(s). Additionally, cords can be removed from V-belts and other elastomeric structures. Since the core yarns may be thermoplastic and may have been stretched or otherwise deformed during the cord heat treatment, one may detect no yarn length difference in such a construction. In that case one can allow the cord to shrink without tension back to an initial configuration in an oven heated to a temperature greater than the glass transition temperature of the core yarn for a period of at least five minutes. One could then measure twist of the oven-exposed cord and measure the length difference of the wrapping yarn(s) and the core yarn(s). The steps of methods herein may generally be performed in any order, unless the context dictates that specific steps be performed in a specific order. Therefore, the invention in its broader aspects is not limited to the specific details, representative apparatus and methods, and illustrative examples shown and described. Accordingly, departures may be made from such details without departing from the spirit or scope of the applicant's general inventive concept.

What is claimed is:

1. A method of making a heat-treated hybrid cord, comprising:
    providing at least one core yarn having a Young's modulus; and
    providing a plurality of wrapping yarns, each wrapping yarn having a strength of at least 2.5 GPa and a Young's modulus that is at least 5 GPa greater than the Young's modulus of the at least one core yarn; and
    pre-twisting the wrapping yarns in a first direction with a twist multiplier in the range of about 2 to about 6½; and
    twisting the pre-twisted wrapping yarns and the core yarn in the opposite direction with a twist multiplier in the range of about 2 to about 6½ to form a greige hybrid cord; and
    then heat-treating the greige hybrid cord for a time at a temperature and under a load sufficient to accomplish any one of or both of:
        (a) provide a free shrinkage of at least 2½ percent; and/or
        (b) provide a shrinkage force of at least 3 pounds; and
    wherein the wrapping yarns in the greige hybrid cord have an untwisted yarn length that is about 0.8% to about 5% greater than the untwisted yarn length of the at last one core yarn in the hybrid cord.

2. The method of making a heat-treated hybrid cord according to claim 1 wherein twisting the wrapping yarns in a first direction comprises twisting the wrapping yarns with a twist multiplier in the range of about 3 to about 4 and further wherein twisting the pre-twisted wrapping yarns and the core yarn comprises twisting the pre-twisted wrapping yarns and the core yarn in the opposite direction with a twist multiplier in the range of about 5 to about 6½.

3. The method of making a heat-treated hybrid cord according to claim 1 wherein heat-treating the greige hybrid cord comprises heating the greige hybrid cord under a load in the range of about 0.1 to about 3 grams per denier tension at a temperature in the range of about 100° C. to about 230° C. for a time in the range of about 25 seconds to about 150 seconds in an oven for a time at a temperature and under a load sufficient to accomplish any two or more of:
    (a) provide a free shrinkage of at least 4 percent; and/or
    (b) provide a shrinkage force of at least 4 pounds; and/or
    (c) provide an increase of at least 50% in LASE3 value in the heat-treated hybrid cord as compared to the greige hybrid cord; and/or
    (d) reduce the elongation at break percentage of the heat-treated hybrid cord by at least 1% as compared to the elongation at break percentage of the greige hybrid cord.

4. The method of making a heat-treated hybrid cord according to claim 1 wherein the core contains a plurality of core yarns.

5. The method of making a heat-treated hybrid cord according to claim 1 wherein the number of core and wrapping yarns comprise one of (a) two core yarns and five wrapping yarns, (b) four core yarns and six wrapping yarns, and (c) three core yarns and six wrapping yarns.

6. The method of making a heat-treated hybrid cord according to claim 1 wherein the number of wrapping yarns is equal to one of (a) the maximum integer number of those wrapping yarns that can be wrapped in a single layer around that core and (b) one less than the maximum integer number of those wrapping yarns that can be wrapped in a single layer around that core, as determined by the formula:

Max Wrap Yarns=$|\cos \beta \cdot \pi/\alpha|$ where $\beta = \tan^{-1}(\pi \cdot T \cdot 2 \cdot [r_w + r_c])$
$\alpha = \sin^{-1}(r_w/[r_w + r_c])$
T=twists per inch
$r_c$=radius of core yarn
$r_w$=radius of wrapping yarn.

7. The method of making a heat-treated hybrid cord according to claim 1 wherein each of the wrapping yarns has a radius within the range of about 0.008 inches to about 0.015 inches, a Young's modulus greater than 70 GPa, and a strength of at least 2.5 GPa.

8. The method of making a heat-treated hybrid cord according to claim 1 wherein the at least one core yarn has a radius within the range of about 0.010 inches to about 0.017 inches and a Young's modulus of 5.0 to 70.0 GPa.

9. The method of making a heat-treated hybrid cord according to claim 1 wherein each of the wrapping yarns has a radius within the range of about 0.008 inches to about 0.015 inches, a Young's modulus greater than 70 GPa, and a strength of at least 2.5 GPa and wherein the at least one core yarn has a radius within the range of about 0.010 inches to about 0.017 inches and a Young's modulus of 5.0 to 70.0 GPa.

10. The method of making a heat-treated hybrid cord according to claim 1 wherein the heat-treated hybrid cord has a breaking strength of at least 320 pounds and a LASE3 value of at least 190 pounds.

11. The method of making a heat-treated hybrid cord according to claim 1 wherein the heat treatment provides a free shrinkage in the heat-treated hybrid cord of at least 4 percent.

12. The method of making a heat-treated hybrid cord according to claim 1 wherein the heat treatment provides a free shrinkage in the heat-treated hybrid cord of 2%-4.3%.

13. The method of making a heat-treated hybrid cord according to claim 1 wherein the heat treatment provides a shrinkage force in the heat-treated hybrid cord of at least 4 pounds.

14. The method of making a heat-treated hybrid cord according to claim 1 wherein the heat treatment provides a shrinkage force in the heat-treated hybrid cord of 3-16 pounds.

15. The method of making a heat-treated hybrid cord according to claim 1 wherein the heat treatment is done in three zones and in the third zone a load is applied to provide the shrinkage force in the heat-treated hybrid cord of 3-16 pounds.

16. The method of making a heat-treated hybrid cord according to claim 1 wherein the heat treatment is done in three zones, in the first zone curing of epoxy or isocyanate adhesive takes place, and in the third zone a load is applied to provide the shrinkage force in the heat-treated hybrid cord of 3-16 pounds.

17. The method of making a heat-treated hybrid cord according to claim 1 wherein the heat treatment provides an increase of at least 100% in LASE3 value in the heat-treated hybrid cord as compared to the greige hybrid cord.

18. The method of making a heat-treated hybrid cord according to claim 1 wherein the heat treatment provides an increase of at least 190% in LASE3 value in the heat-treated hybrid cord as compared to the greige hybrid cord.

19. The method of making a heat-treated hybrid cord according to claim 1 wherein the heat treatment provides an increase of 50%-190% in LASE3 value in the heat-treated hybrid cord as compared to the greige hybrid cord and an elongation at break of less than 10%.

20. The method of making a heat-treated hybrid cord according to claim 1 wherein:
- the number of core and wrapping yarns comprise one of (a) two core yarns and five wrapping yarns, (b) four core yarns and six wrapping yarns, and (c) three core yarns and six wrapping yarns;
- each of the wrapping yarns has a radius within the range of about 0.008 inches to about 0.015 inches, a Young's modulus greater than 70 GPa, and a strength of at least 2.5 GPa;
- the at least one core yarn has a radius within the range of about 0.010 inches to about 0.017 inches and a Young's modulus of 5.0 to 70.0 GPa;
- the heat treatment provides a free shrinkage in the heat-treated hybrid cord of 2%-4.3%;
- the heat treatment provides a shrinkage force in the heat-treated hybrid cord of 3-16 pounds; and
- the heat treatment provides an increase of 50%-190% in LASE3 value in the heat-treated hybrid cord as compared to the greige hybrid cord and an elongation at break of less than 10%.

* * * * *